United States Patent
Ahn et al.

(10) Patent No.: US 10,382,782 B2
(45) Date of Patent: Aug. 13, 2019

(54) IMAGE FRAME INTERPOLATION APPARATUS, DISPLAY APPARATUS AND CONTROL METHOD THEREOF

(71) Applicant: SAMSUNG ELECTRONICS CO., LTD., Suwon-si (KR)

(72) Inventors: Tae-gyoung Ahn, Yongin-si (KR); Hyung-jun Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 14/742,238

(22) Filed: Jun. 17, 2015

(65) Prior Publication Data

US 2015/0382015 A1    Dec. 31, 2015

Related U.S. Application Data

(60) Provisional application No. 62/018,086, filed on Jun. 27, 2014.

(30) Foreign Application Priority Data

Oct. 13, 2014  (KR) .......................... 10-2014-0137629

(51) Int. Cl.
*H04N 19/577* (2014.01)
*H04N 19/513* (2014.01)
*H04N 19/587* (2014.01)

(52) U.S. Cl.
CPC ......... *H04N 19/577* (2014.11); *H04N 19/587* (2014.11)

(58) Field of Classification Search
None
See application file for complete search history.

(56) References Cited

U.S. PATENT DOCUMENTS

| | | | | |
|---|---|---|---|---|
| 6,005,621 A | * | 12/1999 | Linzer | H04N 19/51 375/240.11 |
| 8,692,933 B1 | * | 4/2014 | Namboodri | H04N 19/513 348/441 |
| 2007/0110161 A1 | * | 5/2007 | Saigo | H04N 19/56 375/240.16 |
| 2009/0051819 A1 | * | 2/2009 | Hasegawa | G06T 3/4007 348/699 |
| 2009/0207915 A1 | * | 8/2009 | Yan | H04N 19/53 375/240.16 |
| 2010/0195734 A1 | * | 8/2010 | Huang | H04N 19/56 375/240.16 |
| 2012/0307142 A1 | * | 12/2012 | Koizumi | H04N 7/014 348/441 |

(Continued)

*Primary Examiner* — Edemio Navas, Jr.
(74) *Attorney, Agent, or Firm* — Sughrue Mion, PLLC (57) ABSTRACT

An image frame interpolation apparatus includes a motion vector generator configured to generate a motion vector based on a first image frame and a second image frame; a motion scaler configured to scale the motion vector to thereby generate a scaled motion vector; and a motion compensator including an internal memory, the motion compensator being configured to perform motion compensation based on the scaled motion vector and generate an interpolation frame using the internal memory, the motion scaler being configured to scale the motion vector based on a size of the motion vector and a size of the internal memory.

18 Claims, 9 Drawing Sheets

(56) References Cited

U.S. PATENT DOCUMENTS

| | | | |
|---|---|---|---|
| 2013/0051470 A1* | 2/2013 | Noguchi | H04N 19/521 375/240.14 |
| 2014/0063031 A1* | 3/2014 | Brasnett | G06T 3/0025 345/536 |
| 2014/0092310 A1* | 4/2014 | Hohjoh | H04N 19/587 348/699 |

* cited by examiner

IMAGE FRAME INTERPOLATION APPARATUS, DISPLAY APPARATUS AND CONTROL METHOD THEREOF

CROSS-REFERENCE TO RELATED APPLICATION

This application claims priority to Korean Patent Application No. 10-2014-0137629 filed in the Korean Intellectual Property Office on Oct. 13, 2014, and U.S. Provisional Patent No. 62/018,086, filed in the United States Patent and Trademark Office on Jun. 27, 2014, the disclosures of which are incorporated herein by reference in their entirety.

BACKGROUND

1. Field

Methods and apparatuses consistent with the exemplary embodiments relate to an image frame interpolation apparatus, display apparatus, and control method thereof, and more particularly, to an image frame interpolation apparatus and display apparatus configured to perform image frame interpolation using the ME/MC-based FRC technology, and a control method thereof.

2. Description of the Related Art

Frame rate control (FRC) technology is being widely used in order to resolve motion blurring that occurs in hold-type displays such as LCDs, and problems caused by low frame rates such as motion judders that occur in 24 Hz film images. In a case where the frame rate of an original video is 24 Hz or 60 Hz, it is possible to convert the frame rate into 120 Hz or 240 Hz by interpolating between the frames of the original video with the FRC technology and generating an interpolation frame.

However, as resolutions of digital TVs (DTVs) rapidly increase from full HD (FHD) to 4K, and further to 8K, in order to support this increase in resolution, the size of FRC chips is also increasing, which is a problem. Thus, it is becoming increasingly difficult to implement such chips due to problems of power consumption and generation of heat caused by the increased size of the FRC chips. Therefore, there is a need for a way to reduce the size of FRC chips.

SUMMARY

Exemplary embodiments provide an image frame interpolation apparatus and display apparatus that may reduce a size of an FRC chip by scaling a detected motion when the detected motion is applied to a motion-estimated/motion compensated (ME/MC)-based FRC, and a control method thereof.

According to an aspect of an exemplary embodiment, there is provided an image frame interpolation apparatus including a motion vector generator configured to generate a motion vector based on a first image frame and a second image frame; a motion scaler configured to scale the motion vector to thereby generate a scaled motion vector; and a motion compensator including an internal memory, the motion compensator being configured to perform motion compensation based on the scaled motion vector and generate an interpolation frame using the internal memory, wherein the motion scaler is configured to scale the presumed motion vector based on a size of the motion vector and a size of the internal memory.

The motion vector generator may be configured to generate the motion vector based on a first portion of image data of the first image frame and a second portion of image data of the second image frame.

The motion vector generator may be configured to generate a plurality of the motion vectors, and the motion scaler may be configured to determine a scaling value that prevents a size of a motion vector having a largest motion value among the plurality of motion vectors from exceeding a search range stored in the internal memory, and down-scale the plurality of motion vectors based on the determined scaling value.

The motion scaler may be configured to scale all of a plurality of motion vectors corresponding to an entirety of the first image frame and the second image frame according to the determined scaling value.

The motion scaler may be configured to scale the motion vector based on an equation:

$$MV_{mc}(x, y) = \left(\frac{MC_{SR}}{\max_{x,y} MV_{me}(x, y)}\right) \times MV_{me}(x, y),$$

$$\text{for } 0 \le x < W, 0 \le y < H$$

where $MV_{me}(x, y)$ is the motion vector generated by the motion vector generator, $MC_{SR}$ is a search range of the memory, and $MV_{mc}(x, y)$ is the scaled motion vector which is output to the motion compensator.

The first image frame may be a previous image frame, and the second image frame may be a current image frame positioned after the previous image frame in a frame order.

The motion vector generator may include an internal memory, and the internal memory of the motion compensator may have a size that is smaller, by a predetermined size, than a size of the internal memory of the motion vector generator.

According to another aspect of an exemplary embodiment, there is provided a display apparatus including a broadcast receiver configured to receive a broadcast signal; a frame rate converter configured to convert a frame rate of a video signal included in the received broadcast signal; and a display configured to display the video signal having the converted frame rate, wherein the frame rate converter includes a motion vector generator configured to generate a motion vector based on a first image frame and a second image frame included in the video signal, a motion scaler configured to scale the motion vector to thereby generate a scaled motion vector, and a motion compensator including an internal memory, the motion compensator being configured to perform motion compensation based on the scaled motion and generate an interpolation frame using the internal memory, wherein the motion scaler is configured to scale the motion vector based on a size of the motion vector and a size of the internal memory.

The motion vector generator includes an internal memory, and the internal memory of the motion compensator may have a size that is smaller, by a predetermined size, than a size of the internal memory of the motion vector generator.

According to another aspect of an exemplary embodiment, there is provided a method for controlling an image frame interpolation apparatus, the method including generating a motion vector based on a first image frame and a second image frame; scaling the motion vector based on a size of the motion vector and a size of a memory configured to be used in motion compensation; and performing the motion compensation based on the scaled motion vector and generating an interpolation frame using the memory.

The generating the motion vector may include generating the motion vector based on a first portion of image data of the first image frame and a second portion of image data of the second image frame.

The scaling the motion vector may include determining a scaling value that prevents a size of a motion vector having a largest motion value among the plurality of motion vectors from exceeding a search range of the memory, and downscaling the motion vector based on the determined scaling value.

The scaling the presumed motion may include scaling all of the plurality of the motion vectors corresponding to an entirety of the first image frame and the second image frame according to the determined scaling value.

The scaling the motion vector may include scaling the motion vector based on an equation:

$$MV_{mc}(x, y) = \left( \frac{MC_{SR}}{\max\limits_{x,y} MV_{me}(x, y)} \right) \times MV_{me}(x, y),$$

$$\text{for } 0 \leq x < W, 0 \leq y < H$$

where $MV_{me}(x, y)$ is the generated motion vector, $MC_{SR}$ is a search range of the memory, and $MV_{mc}(x, y)$ is the scaled motion vector.

The first image frame may be a previous image frame, and the second image frame may be a current image frame positioned after the previous image frame in a frame order.

The memory configured to be used in motion compensation may have a size that is smaller, by a predetermined size, than a size of a memory used in the generating the motion vector.

According to another aspect of an exemplary embodiment, there is provided a method for controlling a display apparatus, the method including receiving a broadcast signal; converting a frame rate of a video signal included in the received broadcast signal; and displaying the video signal having the converted frame rate, wherein the converting the frame rate may include generating a motion vector based on a first image frame and a second image frame included in the video signal, scaling the motion vector based on a size of the motion vector and a size of a memory configured to be used in motion compensation, and performing motion compensation based on the scaled motion vector and generating an interpolation frame using the memory.

The memory configured to be used in motion compensation may have a size that is smaller, by a predetermined size, than a size of a memory used in the generating of the motion vector.

As aforementioned, according to various exemplary embodiments, it is possible to provide an FRC chip that significantly reduces the MC search range memory while minimizing deterioration of image quality and may thus be used in next generation super high resolution images such as 8K UHD.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since the well-known functions or constructions would obscure the application with unnecessary detail.

Figure 1:
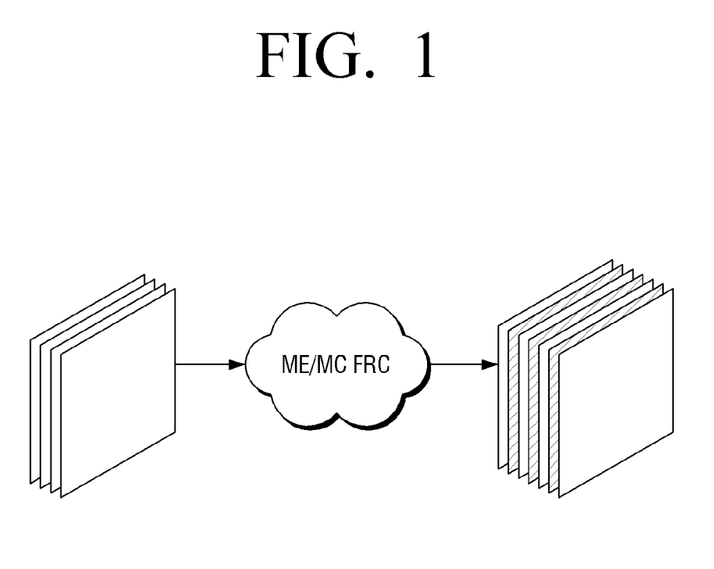
FIG. 1 is a view for explaining a frame rate conversion operation to help understand the exemplary embodiments.

FIG. 1 is a view for explaining a frame rate conversion operation to help understand the exemplary embodiments.

FRC (Frame Rate Conversion) refers to a function of converting a frame rate of a video to be output through a display. When a frame rate of a video is increased using the FRC, a motion appearing in the video becomes smooth and natural. Therefore, when a 120 Hz image is implemented using the FRC technology, the image quality of the video improves.

For example, when a frame rate of an original video is 60 Hz as illustrated, it is possible to convert the frame rate into 120 Hz or 240 Hz by interpolating between frames of the original video and generating an interpolation frame. Specifically, in a case of Motion Estimation—Motion Compensation (ME/MC) FRC, a level of a frame rate is adjusted as the frame rate is increased to a certain level (for example, increased from 60 Hz to 120 Hz), and then motion prediction and correction extent adjustment are performed in a frame to be inserted in order to increase the frame rate. For example, when intending to increase the frame rate of a video from 60 Hz to 120 Hz, a frame may be added to every frame so as to convert an input video having 60 frames per second into a video having 120 frames per second, and then the converted video may be output. It is understood that exemplary embodiments may be applied to video having frame rates greater or less than 60 Hz.

Hereinafter, a method for performing an ME/MC FRC method according to an exemplary embodiment will be explained in detail.

Figure 2:
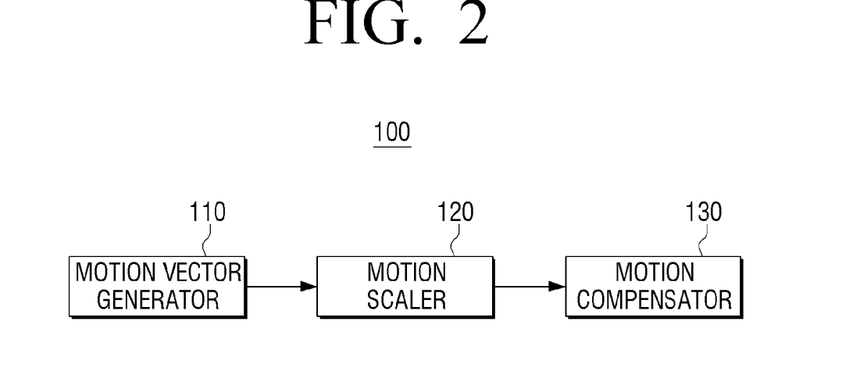
FIG. 2 is a view for explaining a configuration of an image frame interpolation apparatus according to an exemplary embodiment.

FIG. 2 is a view for explaining a configuration of an image frame interpolation apparatus according to an exemplary embodiment.

According to FIG. 2, an image frame interpolation apparatus 100 includes a motion vector generator 110, motion scaler 120, and motion compensator 130.

The motion vector generator 110 generates a motion vector based on a first image frame and a second image frame. According to an exemplary embodiment, the first image frame may be a previous image frame, and the second image frame may be a current image frame.

Specifically, the motion vector generator 110 may generate at least one motion vector based on a reduced image of the first image frame and a reduced image of the second image frame. That is, the motion vector generator 110 may detect a motion in an image reduced in order to enable the reduction of a size of an FRC chip that conventionally has an excessive size due to an increase of a resolution of an image. For example, in a case of reducing an image by ¼ and detecting a motion, a size of an internal memory provided in the motion vector generator 110 may also be reduced by ¼, without a significant deterioration of image quality.

According to exemplary embodiments, the motion vector generator 110 may generate an interpolation frame using a portion of image data regarding the first image frame and a portion of image data regarding the second image frame. Accordingly, it is possible to reduce the size of the internal memory provided in the motion vector generator 110, and reduce an amount of arithmetic operations necessary to generate the interpolation frame, thereby generating the interpolation frame at a rapid speed.

The motion scaler 120 scales the motion vector generated in the motion vector generator 110.

Specifically, the motion scaler 120 may scale at least one motion vector based on a size of the at least one motion vector generated in the motion vector generator 110 and the size of the internal memory of the motion compensator 130 that will be explained hereinafter.

Specifically, according to an exemplary embodiment, the motion scaler 120 may determine a scaling value that prevents the size of the motion vector having the largest motion value of the at least one motion vector generated in the motion vector generator 110 from going beyond (e.g., exceeding) a search range of the internal memory of the motion compensator 130, and may down-scale the at least one motion vector based on the determined scaling value. According to an exemplary embodiment, the motion scaler 120 may scale all of the plurality of motion vectors corresponding to an entirety of the first image frame and the second image frame according to the determined scaling value.

The motion scaler 120 may scale a motion vector based on equation 1 below.

$$MV_{mc}(x, y) = \left(\frac{MC_{SR}}{\max_{x,y} MV_{me}(x, y)}\right) \times MV_{me}(x, y), \quad \text{[Equation 1]}$$

$$\text{for } 0 \le x < W, 0 \le y < H$$

Herein, $MV_{me}(x, y)$ represents the motion vector detected in the motion vector generator 110, $MC_{SR}$ represents the search range of the motion compensator 130, and $Mv_{mc}(x, y)$ represents the scaled motion output to the motion compensator 130.

Using the internal memory, the motion compensator 130 performs compensation on the motion (e.g., motion vectors) scaled in the motion scaler 120 and generates an interpolation frame. According to an exemplary embodiment, the internal memory may have a size that is equal to or less than the size of the internal memory provided in the motion vector generator 110. The internal memory of the motion compensator 130 may be less than the size of the internal memory provided in the motion vector generator 110 by a predetermined amount. For example, in a case where the internal memory provided in an existing motion compensator 130 has a size of 20 million garbage collection (G/C), the internal memory provided in the motion compensator 130 according to an exemplary embodiment may have a size of 10 million G/C. Accordingly, the search range of the memory may be reduced as compared to the related art, but this reduction may not cause a problem since compensation is performed based on the scaled motion.

Figure 3A:
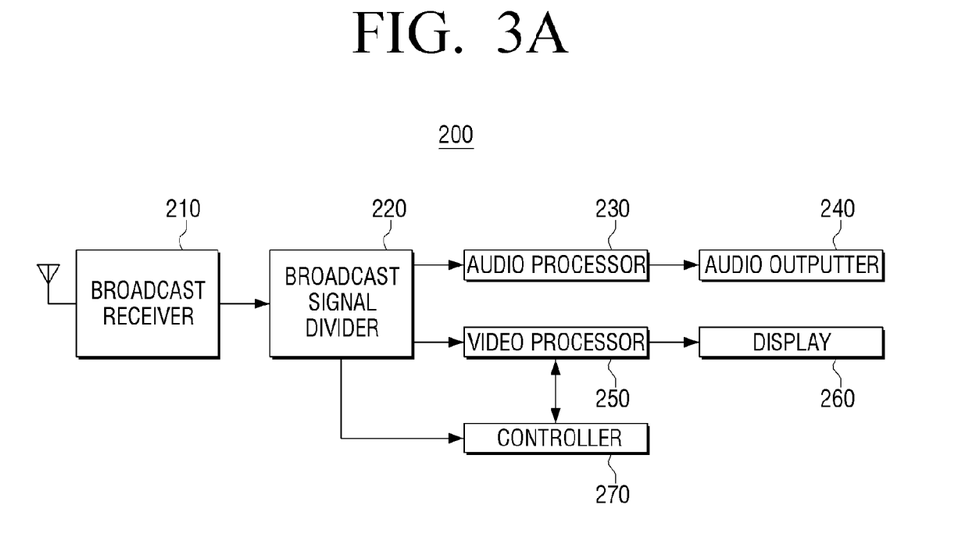
FIGS. 3A to 3B are views for explaining a configuration of a display apparatus to which an image frame interpolation apparatus illustrated in FIG. 2 may be applied.
Figure 3B:
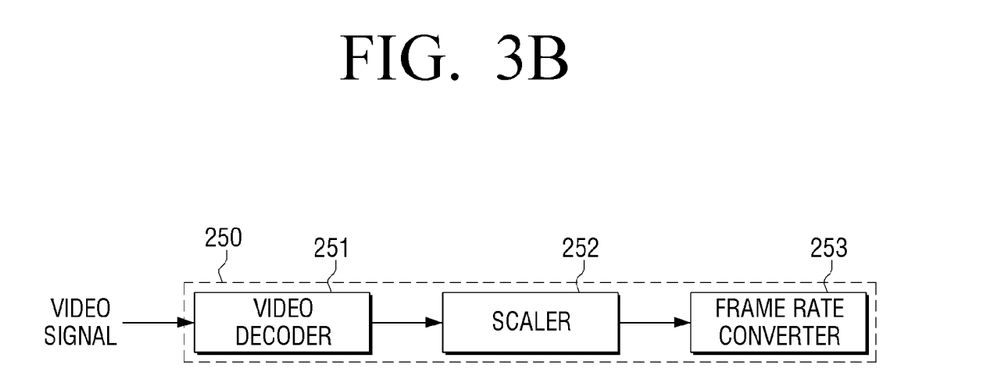

FIGS. 3A and 3B are views for explaining a configuration of a display apparatus to which an image frame interpolation apparatus illustrated in FIG. 2 may be applied.

FIG. 3A illustrates a case where a display apparatus according to an exemplary embodiment is embodied as a digital TV. According to FIG. 3A, the display apparatus 200 includes a broadcast receiver 210, broadcast signal divider 220, audio processor 230, audio outputter 240, video processor 250, display 260, and controller 270.

The broadcast receiver 210 selects one broadcast among broadcasts received wirelessly or wiredly via air or a cable, and demodulates the selected broadcast.

The broadcast signal divider 220 divides a broadcasting signal received from the broadcast receiver 210 into an audio signal, video signal and additional data, and outputs the same. The audio signal and video signal divided from the broadcast signal are applied to the audio processor 230 and video processor 250, respectively. The additional data is applied to the controller 290, and the additional data may be PSIP (Program and System Information Protocol) information.

The audio processor 230 decodes the audio signal output from the broadcast divider 220. Furthermore, the audio processor 230 converts the decoded audio signal into an audio signal having a format outputtable through a speaker provided in the TV.

The audio outputter 240 outputs the audio signal output from the audio processor 230 through the speaker.

The video processor 250 performs image signal processing such as video decoding and video scaling regarding the video signal output from the broadcast signal divider 220. The video processor 250 will be explained in detail with reference to FIG. 3B.

FIG. 3B is a detailed block diagram of a video processor according to an exemplary embodiment.

As illustrated in FIG. 3B, the video processor 250 includes a video decoder 251, scaler 252, and frame rate converter (FRC 253).

The video decoder 251 decodes the video signal output from the broadcast signal divider 220. Accordingly, a decompressed video signal is output from the video decoder 251.

The scaler 252 scales the size of the video regarding the decoded video signal output from the video decoder 251 into a size appropriate to the display 260.

The frame rate converter 253 performs frame rate conversion regarding the video scaled in the scaler 252. For example, in a case where the frame rate of the video transmitted from the scaler 252 is 60 Hz, the frame rate converter 253 may convert the frame rate of the video to 120 Hz. The image frame interpolation apparatus illustrated in FIG. 2 may be implemented as such a frame rate converter 253.

The display 260 displays the video output from the video processor 250. That is, the display 260 outputs the video of which the frame rate has been converted according to operation prediction and correction technology, and the image output accordingly may be expressed as an image with smoother motions.

The controller 270 controls overall operations of the aforementioned components.

Figure 4:
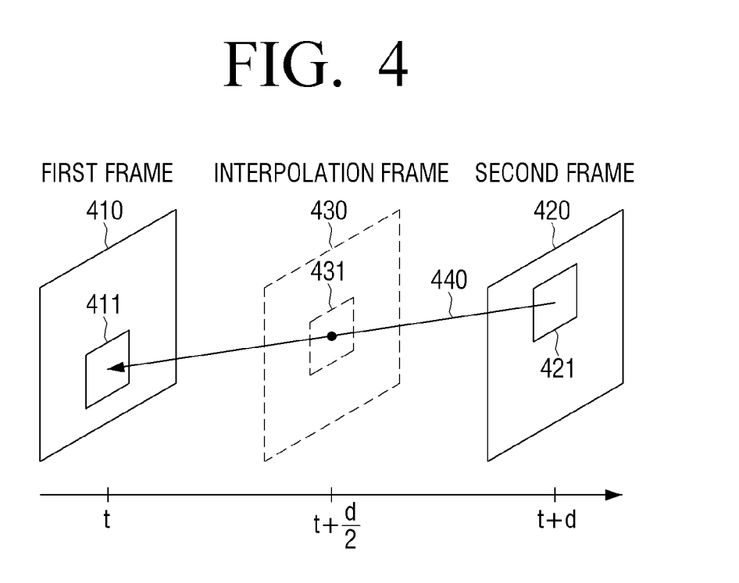
FIG. 4 is a view for explaining a method for generating an interpolation image frame according to an exemplary embodiment.

FIG. 4 is a view for explaining a method for generating an interpolation image frame according to an exemplary embodiment.

According to FIG. 4, a motion vector 440 is predicted in order to interpolate between a first image frame 410 of a time (t) and a second image frame 420 of a time (T+d) and generate an interpolation image frame 430.

Specifically, a block 411 similar to a block 421 of the second image frame 420 is searched for and identified in the first image frame 410, and based on this search result, the motion vector 440 is predicted. FIG. 4 illustrates that a forward motion vector 440 is generated, but the exemplary embodiments are not limited thereto. For example, a motion prediction may be performed in the second image frame 420 with reference to the first image frame 410, generating a backward motion vector. Then, based on the generated motion vector 440, an interpolation image frame between the first image frame 410 and the second image frame 420 may be generated.

Figure 5:
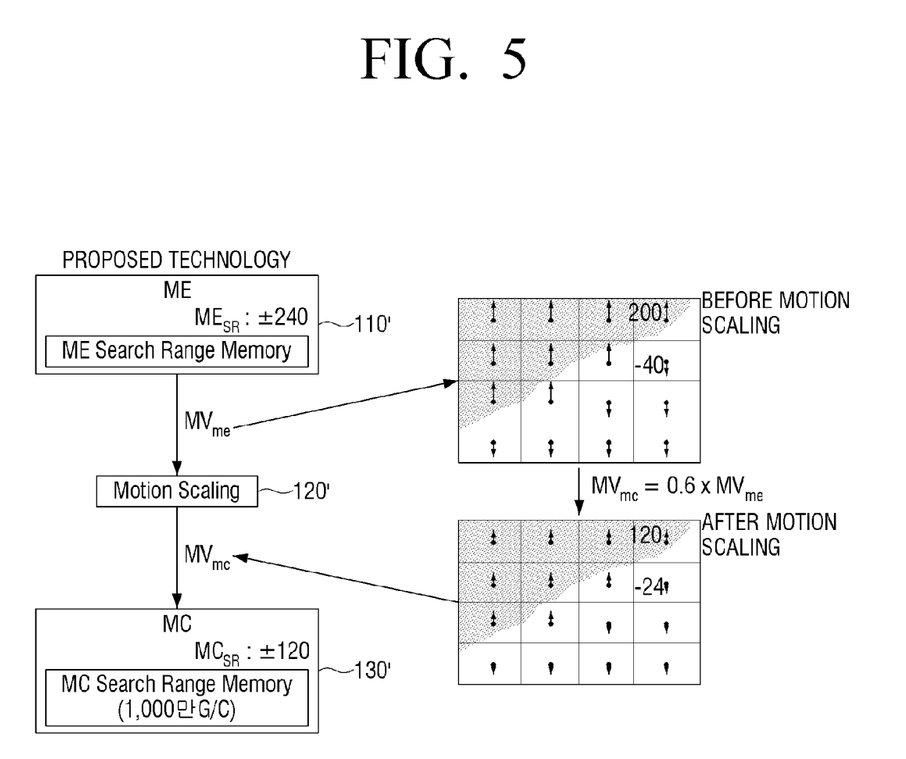
FIG. 5 is a view for explaining a method for performing a motion scaling technique according to an exemplary embodiment.

FIG. 5 is a view for explaining a method for performing motion scaling according to an exemplary embodiment.

According to FIG. 5, an ME block 110' detects a motion (e.g., motion vector) from a reduced image of an input image as aforementioned. Then, a motion scaling block 120' determines a largest motion of the detected motions, and calculates a scaling ratio of a search range of the ME block 110' to a search range of the MC block 130' based on the motion determined as being the largest motion. Then, the motion scaling block 120' down scales an entirety of motions corresponding to the image frame in accordance with the calculated scaling ratio, and transmits the entirety of the down scaled motions to the MC block 130'. In this case, the scaled motion may be obtained by equation 1 mentioned above.

For example, as illustrated in FIG. 5, in a case where the largest motion (max MVme) of the motions (MVme) detected in the ME block 110' is 200 pixels, and the search range of the MC block 130' (MCSR) is 120 pixels, a scaling ratio 120/200=0.6 is calculated, and the entirety of motions are down scaled according to the calculated scaling ratio and transmitted to the MC block 130'.

That is, even when only one motion is detected in the ME block 110', when the detected motion is outside the search range of the MC block 130', it is possible to generate an interpolation frame by performing MC with only an MC search range memory of an optimal size by reducing the entirety of motions by a corresponding ratio.

Figure 6A:
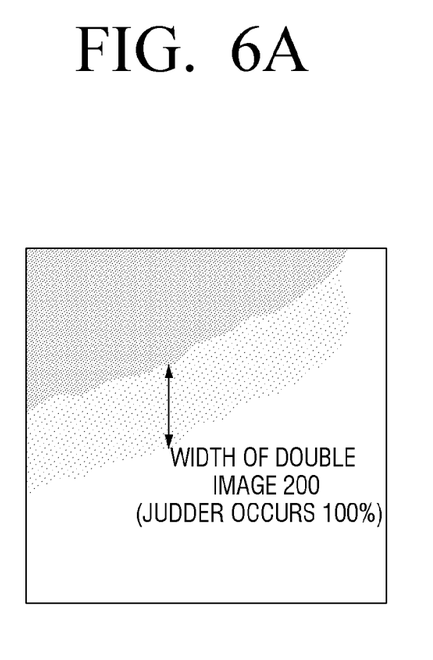
FIGS. 6A and 6B are views for explaining technological effects according to an exemplary embodiment.
Figure 6B:
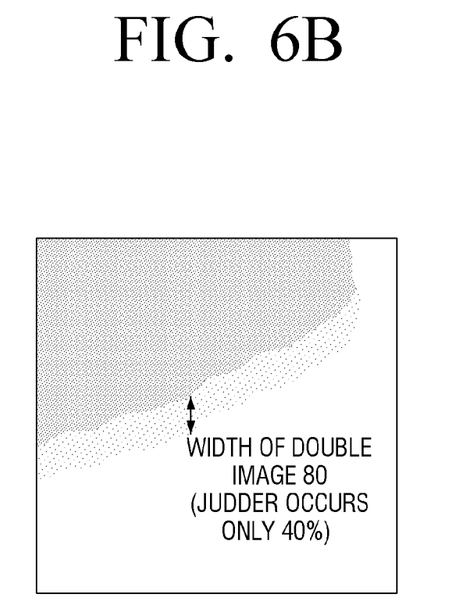

FIGS. 6A and 6B are views for explaining technological effects according to an exemplary embodiment.

FIG. 6A is a view illustrating a double image phenomenon according to the related art, and FIG. 6B is a view illustrating a double image phenomenon according to an exemplary embodiment.

As illustrated in FIG. 6A, in a case where only a size of a search range memory of an MC block is reduced according to an existing method, a double image occurs as much as the size of a motion, and an extreme motion judder therefore occurs. On the other hand, as illustrated in FIG. 6B, in a case where a motion is scaled at the same time of reducing the size of the search range memory of the MC block, a double image occurs as much as the scaling ratio, and thus motion judder occurs only slightly.

For example, in a case where a motion of contents is 200 that is outside the MC search range and the scaling ratio is 0.6, in an existing method, a double image occurs as much as 200 pixels, whereas in a method according to an exemplary embodiment, a double image occurs only as much as 80 pixels. Therefore, according to the exemplary embodiment, motion judder is reduced to about 40% of the related art method.

Figure 7:
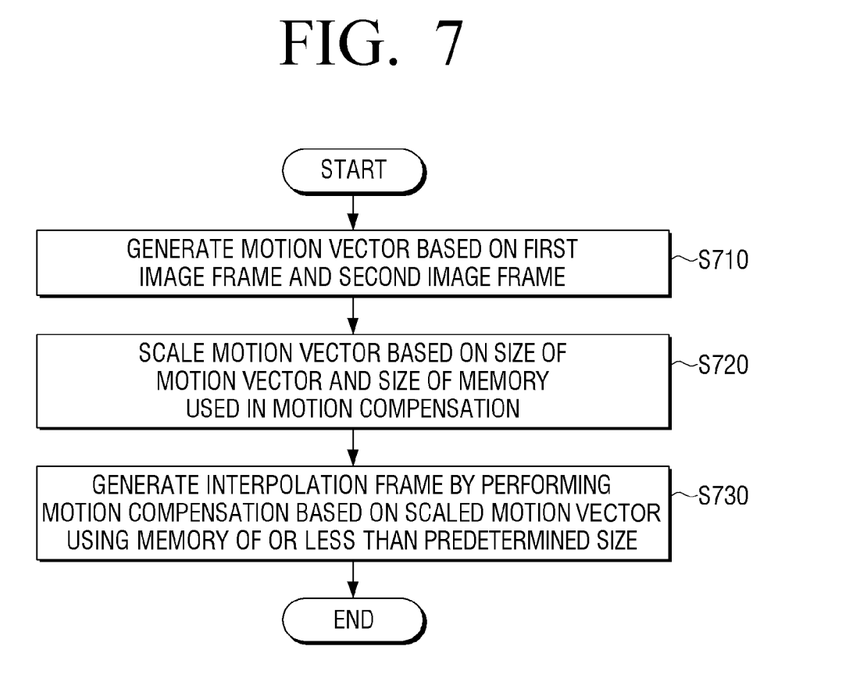
FIG. 7 is a flowchart for explaining a method for controlling an image frame interpolation apparatus according to an exemplary embodiment.

FIG. 7 is a flowchart for explaining a method for controlling an image frame interpolation apparatus according to an exemplary embodiment. In the description of FIG. 7, the components described as performing the method are exemplarily described as the components described above in connection with FIG. 2. However, exemplary embodiments are not limited thereto, and other components instead of or in addition to those components shown in FIG. 2 may also perform the method of FIG. 7.

According to the method for controlling the image frame interpolation apparatus illustrated in FIG. 7, first of all, the motion vector generator 110 generates a motion vector based on the first image frame and second image frame in operation S710. Herein, the first image frame may be a previous image frame, and a second image frame may be a current image frame.

Then, the motion scaler 120 scales the motion vector based on a size of the motion vector and a size of a memory being used in motion compensation in operation S720.

Then, using a memory having a size which is equal to or less than a predetermined size, the motion compensator 130 performs motion compensation regarding the scaled motion and generates an interpolation frame at operation S730. In this case, the size of the memory being used in motion compensation may have a size that is equal to or less than the size of the internal memory being used in motion generation.

Furthermore, at step S710 in which a motion vector is generated, at least one motion vector may be generated based on a reduced image of the first image frame and a reduced image of the second image frame, and at step S720 in which the motion vector is scaled, at least one motion vector may be scaled based on a size of the at least one motion vector and a size of the memory being used in motion compensation.

Furthermore, at step S720 in which the motion vector is scaled, a scaling value may be determined that prevents the size of the motion vector having the largest motion value of the at least one motion vector generated from going beyond a search range of the memory being used in motion compensation, and the at least one motion vector may be down scaled based on the determined scaling value.

Furthermore, at step S720 in which the motion vector is scaled, all of the plurality of motion vectors corresponding to the entirety of the first image frame and second image frame may be scaled according to the determined scaling value.

Furthermore, at step S720 in which the motion vector is scaled, the motion vectors may be scaled based on the aforementioned Equation 1.

As aforementioned, according to various exemplary embodiments, it is possible to reduce the size of an FRC chip to which FRC technology is to be applied while preventing deterioration of image quality caused by the reduction of the size of the FRC chip.

Furthermore, the aforementioned methods according to various exemplary embodiments may be implemented by simply upgrading software of an existing display apparatus or a user terminal apparatus, thereby promoting a convenient and efficient implementation process.

Furthermore, a non-transitory computer readable medium may be provided which stores a program configured to successively perform a controlling method according to the exemplary embodiments.

According to an exemplary embodiment, a non-transitory computer readable medium refers to a computer-readable medium where data may be stored semi-permanently and not a medium that stores data for a short period of time such as a register, cache, memory, etc. Specifically, the aforementioned various applications or programs may be stored in a non-transitory computer readable medium such as a CD, DVD, hard disc, blue ray disc, USB, memory card, and ROM, and be provided. Of course, it is understood that, according to other exemplary embodiments, a non-transitory computer readable medium may refer to a register, cache, and other types of long and short term memories.

Although a few exemplary embodiments have been shown and described, it would be appreciated by those skilled in the art that changes may be made in the exemplary embodiments without departing from the principles and spirit of the exemplary embodiments, the scope of which is defined in the claims and their equivalents.

What is claimed is:

1. An image frame interpolation apparatus comprising:
    a receiver configured to receive a first image frame and a second image frame; and
    a video processor comprising an internal memory, the video processor being configured to:
        generate a motion vector based on the first image frame and the second image frame using a first memory size in the internal memory;
        scale the motion vector based on a size of the motion vector and a size of the internal memory to thereby generate a scaled motion vector; and
        perform motion compensation based on the scaled motion vector and generate an interpolation frame using a second memory size in the internal memory,
    wherein the video processor is configured to generate a plurality of motion vectors including the motion vector, and determine a scaling value that prevents a size of a motion vector having a largest motion value among the plurality of motion vectors from exceeding a search range stored in the internal memory,
    wherein the second memory size is smaller than the first memory size by a predetermined size.

2. The image frame interpolation apparatus according to claim 1,
    wherein the video processor is configured to generate the motion vector based on a first portion of image data of the first image frame and a second portion of image data of the second image frame.

3. The image frame interpolation apparatus according to claim 2,
    wherein the video processor is configured to down-scale the plurality of motion vectors based on the determined scaling value.

4. The image frame interpolation apparatus according to claim 3,
    wherein the video processor is configured to scale all of the plurality of motion vectors corresponding to an entirety of the first image frame and the second image frame according to the determined scaling value.

5. The image frame interpolation apparatus according to claim 2,
wherein the video processor is configured to scale the motion vector based on an equation:

$$MV_{me}(x, y) = \left( \frac{MC_{SR}}{\max_{x,y} MV_{me}(x, y)} \right) \times MV_{me}(x, y),$$

for $0 \leq x < W, 0 \leq y < H$ where $MV_{me}(x, y)$ is the motion vector generated by the video processor, $MC_{SR}$ is the search range of the internal memory, and $MV_{mc}(x, y)$ is the scaled motion vector which is output to the video processor.

6. The image frame interpolation apparatus according to claim 1,
    wherein the first image frame is a previous image frame, and the second image frame is a current image frame positioned after the previous image frame in a frame order.

7. The image frame interpolation apparatus according to claim 1,
    wherein the internal memory of the video processor has a size that is smaller than a predetermined size.

8. A display apparatus comprising:
    a broadcast receiver configured to receive a broadcast signal;
    a video processor configured to convert a frame rate of a video signal included in the received broadcast signal; and
    a display configured to display the video signal having the converted frame rate,
    wherein the video processor comprises an internal memory and is configured to:
        generate a motion vector based on a first image frame and a second image frame included in the video signal using a first memory size in the internal memory;
        scale the motion vector based on a size of the motion vector and a size of the internal memory to thereby generate a scaled motion vector, and
        perform motion compensation based on the scaled motion vector and generate an interpolation frame using a second memory size in the internal memory,
    wherein the video processor is configured to generate a plurality of motion vectors including the motion vector, and determine a scaling value that prevents a size of a motion vector having a largest motion value among the plurality of motion vectors from exceeding a search range stored in the internal memory,
    wherein the second memory size is smaller than the first memory size by a predetermined size.

9. The display apparatus according to claim 8,
    wherein the internal memory of the video processor has a size that is smaller than a predetermined size.

10. A method for controlling an image frame interpolation apparatus, the method comprising:
    generating a motion vector based on a first image frame and a second image frame using a first memory size in a memory configured to be used in motion compensation;
    scaling the motion vector based on a size of the motion vector and a size of the memory; and
    performing the motion compensation based on the scaled motion vector and generating an interpolation frame using a second memory size in the memory, wherein the generating the motion vector further comprises generating a plurality of motion vectors including the motion vector, wherein the method further comprises determining a scaling value that prevents a size of a motion vector having a largest motion value among the plurality of motion vectors from exceeding a search range stored in the memory, and wherein the second memory size is smaller than the first memory size by a predetermined size.

11. The method according to claim 10,
wherein the generating the motion vector comprises generating the motion vector based on a first portion of image data of the first image frame and a second portion of image data of the second image frame.

12. The method according to claim 11,
wherein the scaling the motion vector comprises:
down-scaling the motion vector based on the determined scaling value.

13. The method according to claim 12,
wherein the scaling the motion vector comprises scaling all of the plurality of motion vectors corresponding to an entirety of the first image frame and the second image frame according to the determined scaling value.

14. The method according to claim 11,
wherein the scaling the motion vector comprises scaling the motion vector based on an equation:

$$MV_{me}(x, y) = \left( \frac{MC_{SR}}{\max_{x,y} MV_{me}(x, y)} \right) \times MV_{me}(x, y),$$

for $0 \leq x < W, 0 \leq y < H$ where $MV_{me}(x, y)$ is the generated motion vector, $MC_{SR}$ is the search range of the memory, and $MV_{mc}(x, y)$ is the scaled motion vector.

15. The method according to claim 10,
wherein the first image frame is a previous image frame, and the second image frame is a current image frame positioned after the previous image frame in a frame order.

16. A method for controlling a display apparatus, the method comprising:
receiving a broadcast signal;
converting a frame rate of a video signal included in the received broadcast signal; and
displaying the video signal having the converted frame rate, wherein the converting the frame rate comprises:
generating a motion vector based on a first image frame and a second image frame included in the video signal using a first memory size in an internal memory,
scaling the motion vector based on a size of the motion vector and a size of a memory configured to be used in motion compensation, and
performing motion compensation based on the scaled motion vector and generating an interpolation frame using a second memory size in the internal memory, wherein the generating the motion vector further comprises generating a plurality of motion vectors including the motion vector, and the method further comprises determining a scaling value that prevents a size of a motion vector having a largest motion value among the plurality of motion vectors from exceeding a search range stored in the memory, wherein the second memory size is smaller than the first memory size by a predetermined size.

17. A video apparatus comprising:
a receiver configured to receive a frame of a video; and
a video processor comprising an internal memory, the video processor configured to:
scale a motion vector obtained from the frame of the video to thereby generate a scaled motion vector using a first memory size in the internal memory; and
perform motion compensation based on the scaled motion vector using a second memory size in the internal memory, wherein the video processor is configured to scale the motion vector based on a search range of the internal memory, and wherein the video processor is configured to determine a scaling value that prevents a size of a motion vector having a largest motion value among a plurality of motion vectors including the motion vector from exceeding the search range stored in the internal memory, wherein the second memory size is smaller than the first memory size by a predetermined size.

18. The video apparatus according to claim 17, wherein the video processor is further configured to reduce the frame of the video to thereby obtain a reduced frame, wherein the video processor is configured to generate the motion vector from the reduced frame.

* * * * *